Patented Oct. 22, 1935

2,018,238

UNITED STATES PATENT OFFICE 2,018,238

TRANSPORTATION SYSTEM

Norman W. Storer, Pittsburgh, Pa., assignor to Westinghouse Electric & Manufacturing Company, East Pittsburgh, Pa., a corporation of Pennsylvania Application May 18, 1932, Serial No. 612,014

40 Claims. (Cl. 104—20)

My invention relates, generally, to transportation systems and more particularly to transportation systems commonly known as moving platforms.

The problem of providing adequate transportation for great numbers of people in the more congested districts of our large cities is a difficult one that has not as yet been satisfactorily solved. A great many systems have been advanced which propose to utilize moving sidewalks, or devices which move continuously, for transporting large masses of people. Some of these have been built and operated experimentally, but for various reasons none of the systems utilizing continuously moving vehicles has been considered sufficiently meritorious to be exploited commercially.

Most of the systems previously suggested have proposed the use of several platforms running side by side at different rates of speed which vary progressively from a speed of approximately three miles per hour, for the platform next to a stationary platform, by steps of about three miles per hour, up to a speed of 9 or 12 miles per hour for the platform operating at the highest speed. A few of the disadvantages of systems of this type are:

(1) They are not adaptable for high speed service;

(2) They are only suitable for transporting people short distances;

(3) The increment of speed between adjacent platforms is such as to make it difficult, if not dangerous for persons to transfer from one platform to another.

An object of my invention generally stated, is to provide a transportation system in which the foregoing disadvantages will be overcome, and which will be efficient in operation and may be economically manufactured and installed.

A more specific object of my invention is to provide for operating a plurality of parallel moving vehicles in such manner that one of the vehicles is decelerated to receive or discharge passengers, while another vehicle is accelerated to transport passengers at a predetermined speed, and the vehicle that has received passengers is accelerated while the transporting vehicle is decelerated to permit passengers to transfer from one vehicle to an adjacent vehicle while they are moving at substantially the same speed.

It is also an object of my invention to provide for utilizing the momentum of a decelerating vehicle to accelerate another vehicle.

Other objects of my invention will be either explained fully hereinafter or will be apparent to those skilled in the art.

According to my invention, two, or more, continuous, parallel platforms or trains are provided, one of which operates continuously at a high average speed, but not a constant speed, while the speed of the other platform varies in cycles between standstill, or a very slow speed, and a maximum speed which is equal to the minimum speed of the high speed platform. Passengers are permitted to board the slow speed platform while it is at a standstill. The slow speed platform is then accelerated while the high-speed platform is decelerated and when the two trains reach the same speed, they run at substantially the same speed for a definite time to permit the interchanging of passengers between the two platforms. The high speed platform is then accelerated to its maximum speed and the slow speed platform is decelerated to its minimum speed at which it remains for a definite period to permit the loading and unloading of passengers. The slow speed platform is then accelerated and the cycle of operation is repeated.

The two trains are so controlled that the high speed platform is slowing down while the slow speed platform is accelerating, thereby permitting a transfer of energy between the two trains which is accomplished by a system of regeneration by which the stored energy of one train is utilized to accelerate the other. In this manner, all losses of energy resulting from the stopping of the trains by mechanical brakes are eliminated. By properly proportioning the relative speeds of the two trains, a high load factor is secured, and the only energy used in operating the system is that required to overcome train resistance and to supply the losses in the machines which propel the trains.

For a fuller understanding of the nature and scope of the invention, reference may be had to the following detailed description, taken in conjunction with the accompanying drawings in which.

Referring to the drawings, and particularly to Figs. 1, 2, 3 and 4, the reference numeral 10 designates a continuous platform or train which moves continuously at a high average speed, but not at a constant speed, and 11 designates a transfer or slow speed platform, the speed of which varies in cycles between standstill, or a very slow speed, and the minimum speed of the high speed platform. The high speed or carrying platform may preferably consist of a continuous train of enclosed cars provided with seats, and the slow speed or transfer platform may be open and without seats, as the passengers remain on this platform only during a short interval when transferring to and from the high speed train. A sufficient number of posts may be placed on the slow speed cars to permit the passengers to steady themselves during the acceleration of the cars.

Figure 1:
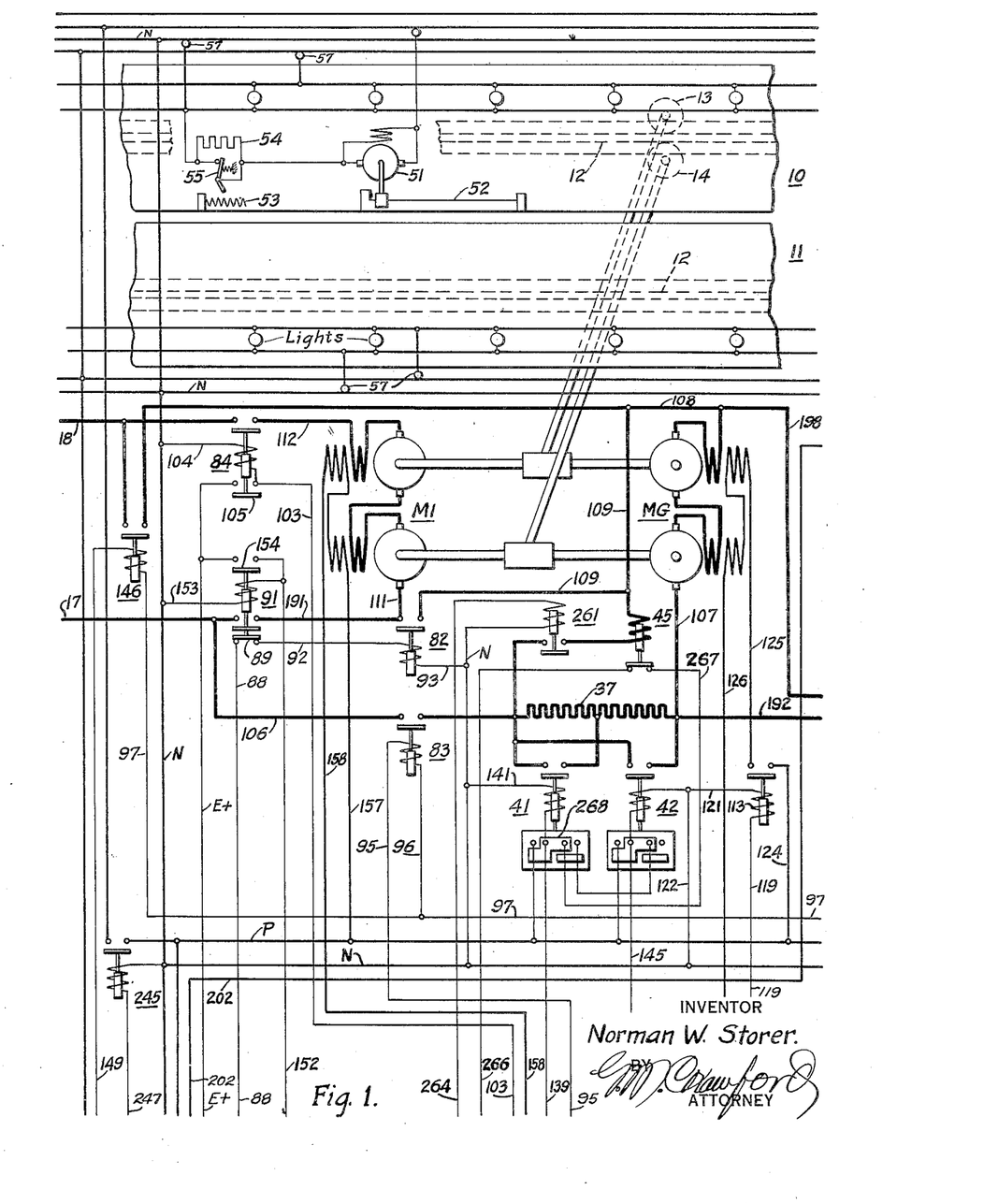
Figures 1, 2, 3 and 4 constitute a diagrammatic view of a control system embodying my invention. The four figures may be combined by placing Fig. 2 to the right of Fig. 1, Fig. 3 at the bottom of Fig. 1 and Fig. 4 to the right of Fig. 3.
Figures 2, 5:
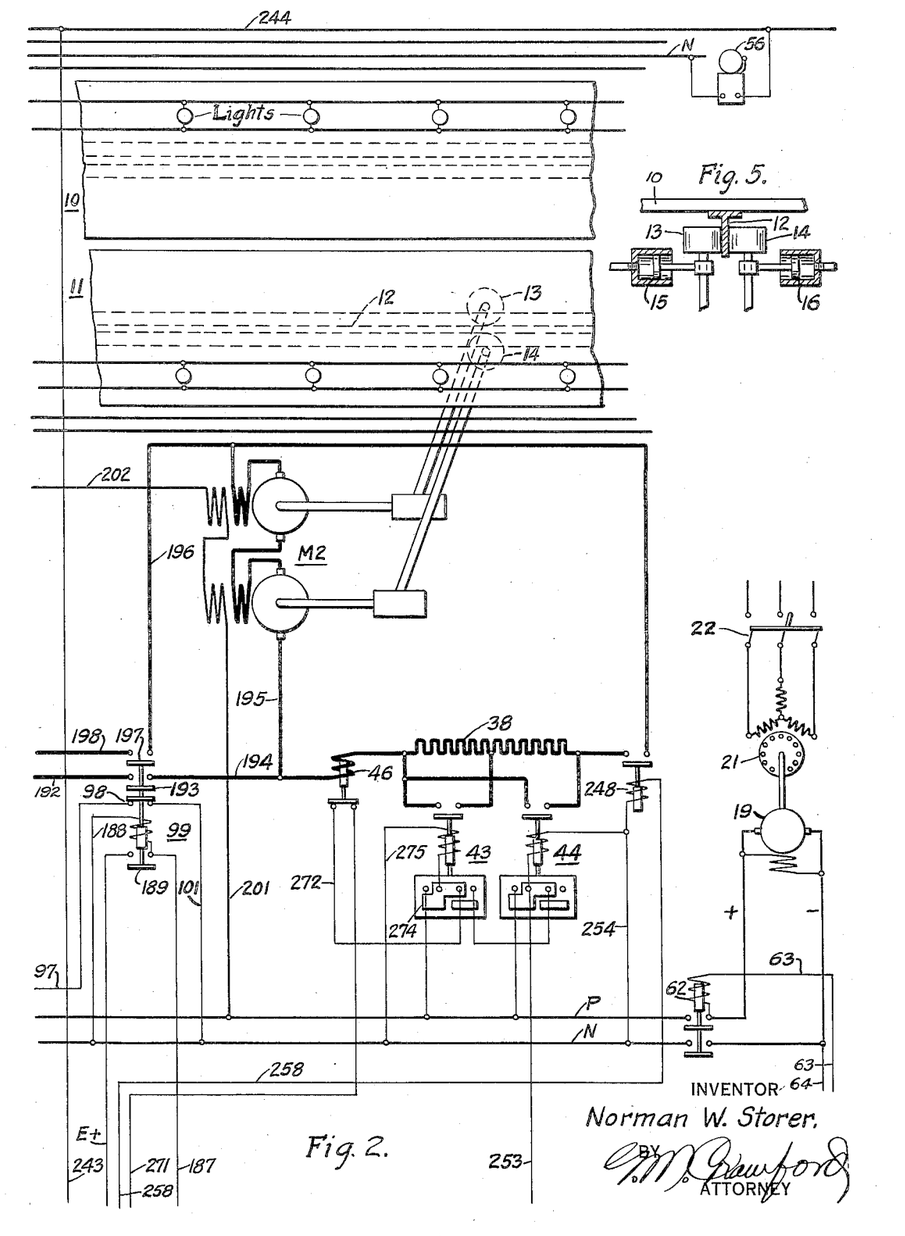
Fig. 5 is a detailed view of an adhesion drive utilized to propel the moving platforms.
Figure 3:
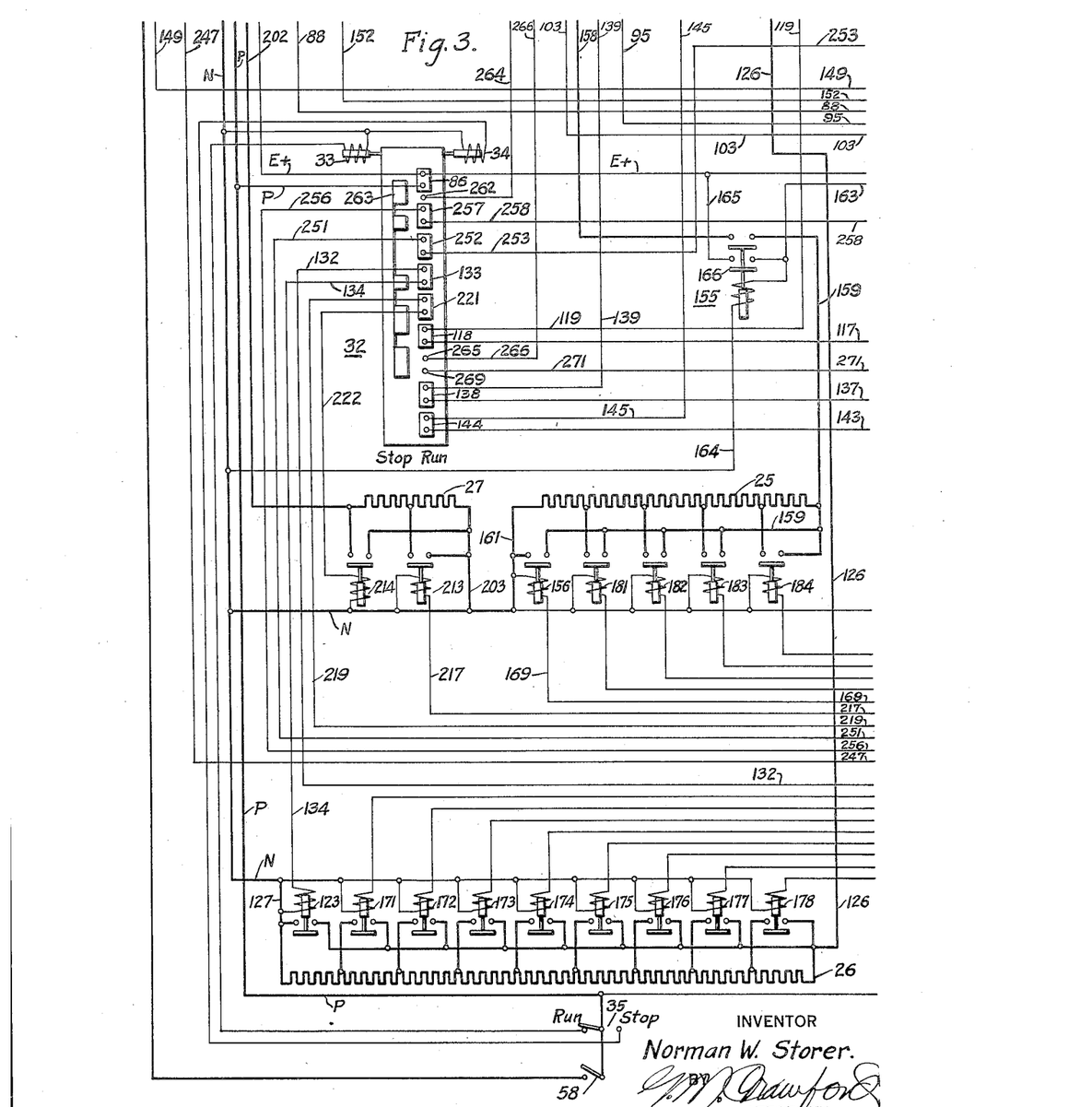
Figure 4:
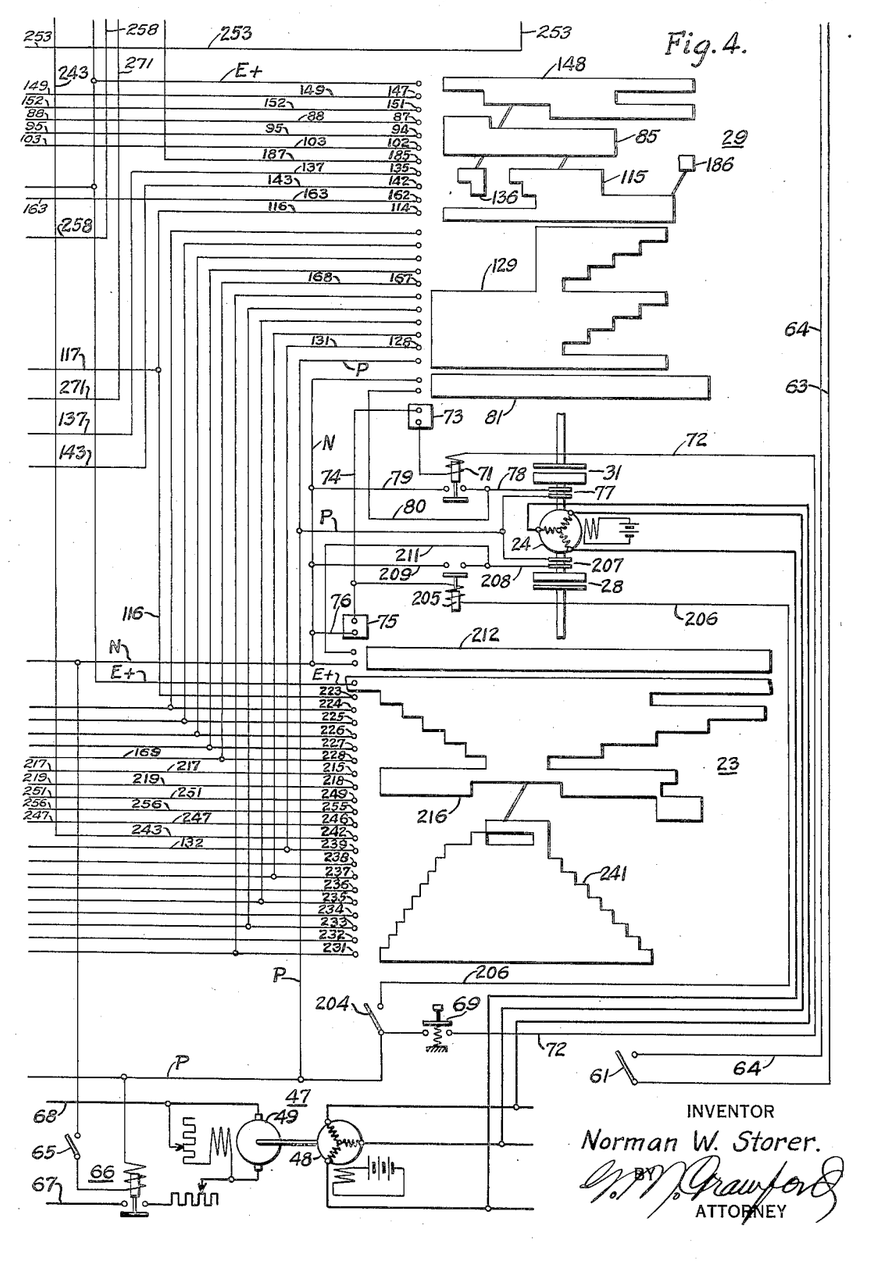

As shown in Fig. 5, the platforms may be propelled by an adhesion or roller drive which comprises a T rail 12, secured to the cars, and two vertical shaft rollers 13 and 14, one on each side of the web of the T rail. The rollers are held against the rail by suitable pistons 15 and 16, actuated by air pressure, as illustrated in Fig. 5. The structure of the cars and the friction drive mechanism is fully described in my copending application, Serial No. 640,161, filed October 29, 1932, and assigned to the Westinghouse Electric & Manufacturing Company, and therefore will not be described in detail in this application.

Each of the shafts which drive the rollers for the high speed platform 10 is geared to two motors designated at M1 and MG, while each roller for the slow-speed platform 11 is geared to only one motor, designated as M2. The motors shown are all compound wound, each having a series field winding and a separately excited shunt field winding. As shown, the two motors designated as M1 are connected in series circuit relation, also the two motors designated as MG are connected in series and likewise the two motors M2, which drive the slow-speed platform, are connected in series. Direct-current energy for operating the motors is supplied through conductors 17 and 18 which may be connected to any suitable source of power.

The motors M1, MG and M2 are disposed in driving stations underneath the tracks and the moving platforms. The driving stations may be located at suitable intervals throughout the system in accordance with the power required for propelling the platforms. Energy for exciting the shunt field windings of the motors and for energizing the control equipment is supplied by a direct current exciter 19, driven by an induction motor 21 which may be connected to a suitable power source by a switch 22.

The speed of the two trains is controlled by sequence control drums 23, one of which is located in each station. The sequence drums are driven by synchronous motors 24, thereby keeping all the stations operating in exact synchronism. The sequence drum controls the speeds of the two trains by varying the field excitation of the motors M1, MG and M2 by means of resistors 25, 26 and 27, which are connected in the shunt field circuits of the motors M1, MG and M2, respectively. The sequence drum 23 is driven by the motor 24 through an electrically-operated clutch and gear mechanism 28, the gear reduction being such that the drum makes one complete revolution during the time of one cycle of operation of the trains. It is so adjusted that the speeds of the motors are such as to maintain the correct speed ratios between the two platforms at all times during each cycle of operation.

Another sequence drum 29 is provided for controlling the motors during the starting of the trains from rest, which will normally be required only once a day. The drum 29 is driven by the motor 24 through a clutch and gear mechanism 31, similar to the clutch 28. The starting drum 29 will make one complete revolution during the starting period and then be stopped automatically. The cycle drum 23 is operated continuously while the platforms are in operation.

As shown on the drawings, the resistors 25 and 26, which control the current in the separately-excited field windings of the motors M1 and MG, are shunted in successive steps by a plurality of electrically-operated switches which, in turn, are controlled by contact segments on the sequence drums 23 and 29. However, I do not desire to be limited to the use of such switches, as it will be readily understood that the same results may be obtained by providing face plate rheostats or other suitable devices which may be operated by the same shafts which drive the sequence drums.

A third control drum 32 is provided for stopping the trains in an emergency. As shown, the drum 32 has only two positions, designated as "stop" and "run". The drum is operated by two solenoids 33 and 34 which may be controlled by a switch 35 located in a master control station. If desired, additional control switches may be located at various points throughout the system to permit the trains to be stopped in emergencies. When the drum 32 is actuated to the "stop" position, the motors M1 are disconnected from the power line, the connections between the motors MG and M2 are interrupted, the resistors in their separately excited fields are shunted, and the armatures of the motors MG and M2 are connected across separate resistors 37 and 38, respectively, thereby establishing dynamic braking connections for these motors. The resistors 37 and 38 are shunted in successive steps by electrically-operated switches 41 and 42, 43 and 44, which are automatically controlled by current-limit relays 45 and 46, connected in the respective motor circuits. The trains may be quickly stopped by the machines MG and M2, which act as generators and the stored energy of the trains is dissipated through the resistors.

The power for operating the synchronous motors 24, which drive the sequence drums, is supplied by a motor-generator set 47, which is located in the master control station. The motor-generator set comprises an alternating-current generator 48 driven by a variable speed direct-current motor 49. It is evident that the rate of rotation of all the sequence drums in the system may be controlled by controlling the speed of the generator 48. Varying its speed will vary its frequency which, in turn, will vary the speed of all the synchronous motors, throughout the system, which drive the sequence drums. In this manner, the time of each cycle of operation of the trains may be controlled and the number of stops made per mile by the slow-speed platform may be regulated in accordance with traffic conditions. The speed of the trains may be controlled by controlling the voltage impressed upon the power conductors 17 and 18, which may be readily accomplished by regulating the voltage of the power source.

As previously stated, the cars of the high speed train are preferably enclosed. In order that the doors of the cars will be automatically opened to permit the transfer of passengers during the time that the two platforms are running at the same speed, the doors may be operated by electric motors 51 which are controlled by the cycle drum 23. When the motor 51 is energized the door 52 is opened and when the motor is deenergized the door is closed by a suitable spring 53. The voltage impressed upon the motor 51 during the time that the door is held open is regulated by a resistor 54 which is connected in the motor circuit by a switch 55 operated by the door as it is opened. A signal 56 is also energized through contact segments on the cycle drum 23, thereby notifying the passengers when the doors on the cars will be opened and also warning them when the doors start to close. The current for operating the doors motors, the signals and also the lights in the cars may be conducted through conductors disposed parallel to the tracks and collected by trolley collectors 57 mounted on the cars or the signals may be placed at suitable intervals along the stationary platform. The lights may be controlled by a switch 58, located in the central control station.

As previously stated, the two trains are so controlled that the carrying or high-speed platform is slowing down at the same time that the transfer or slow-speed platform is accelerating. This may be better understood by referring to the curves in Fig. 7 of the drawings, which graphically represent the speeds of the two trains during the cycle of operation. When the two trains reach the same speed, they run at practically the same speed for a definite time to permit the interchange of passengers between the two platforms. The carrying platform is then accelerated to its maximum speed and the transfer platform decelerates to its minimum speed, or a standstill, at which it remains for another definite period for the loading and unloading of passengers. The cycle is then repeated, as illustrated by the curves in Fig. 7.

In order to reduce the total quantity of power required to operate the system and also to prevent high peak loads on the power system when the trains are being accelerated, the driving motors are so connected that energy is transferred from the train that is being decelerated to the one that is being accelerated.

Figure 6:
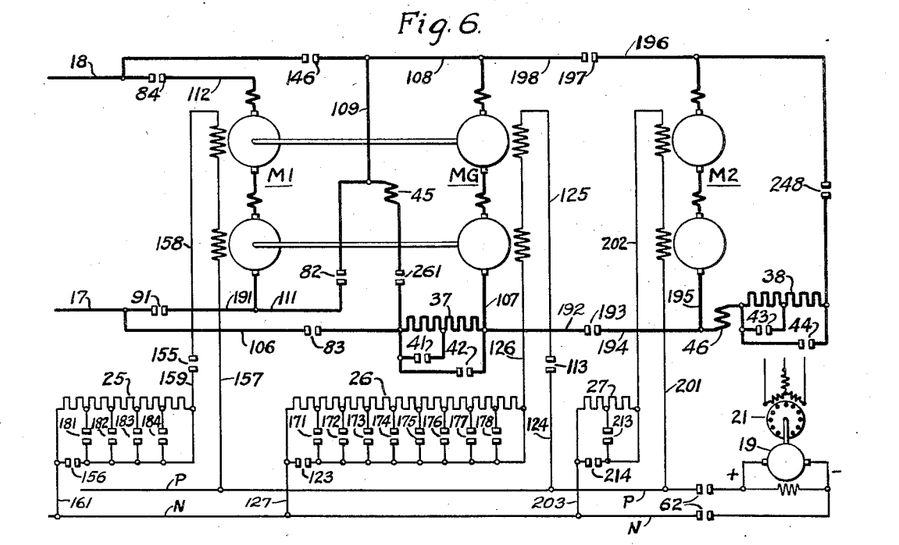
Fig. 6 is a schematic diagram, showing the main motor connections.

As shown in the schematic diagram in Fig. 6, the motors M1, which drive the high-speed train, are connected to the power conductors 17 and 18, which are energized from the main power system. The machines MG are geared to the same countershaft as the motors M1 and their speed is therefore proportional to that of the high-speed train. The armatures of the motors M2, which drive the slow-speed train, are connected in parallel with the armatures of the machines MG. The machines MG and M2 are, preferably, of duplicate design and, therefore, have similar operating characteristics. They are so connected that when the slow-speed train is accelerating, the machines MG will act as generators, furnishing current to the motors M2 which accelerate the slow-speed train. The machines MG are driven, in part, by the stored energy of the high-speed train, which is being decelerated, and in part by motors M1.

When the slow-speed train decelerates, the machines M2 act as generators, furnishing current to the machines MG, driving them as motors to assist in the acceleration of the high-speed train. In both of these cases, when the machines are functioning as generators they are driven, entirely in the case of machine M2 and partly in the case of machine MG, by the train to which they are mechanically connected, thereby transforming the stored energy of the train into electrical energy to accelerate the other train. It will be noted that the motors M1 are the only ones connected to the main power supply during normal operation of the system and that they will operate at a substantially uniform load throughout the cycle.

The speed at which the motors operate and, therefore, the speed of the respective trains is controlled by varying the field strength of the machines M1, MG and M2 by means of the resistors 25, 26 and 27 which control the excitation current in the separately excited field windings of the motors M1, MG and M2, respectively. The resistors in the field circuits may be shunted in successive steps by a plurality of electrically-operated switches which are controlled by the sequence drums or, as previously stated, the field current may be controlled directly by face plate rheostats operated by the same synchronous motors which drive the sequence drums.

Figure 7:
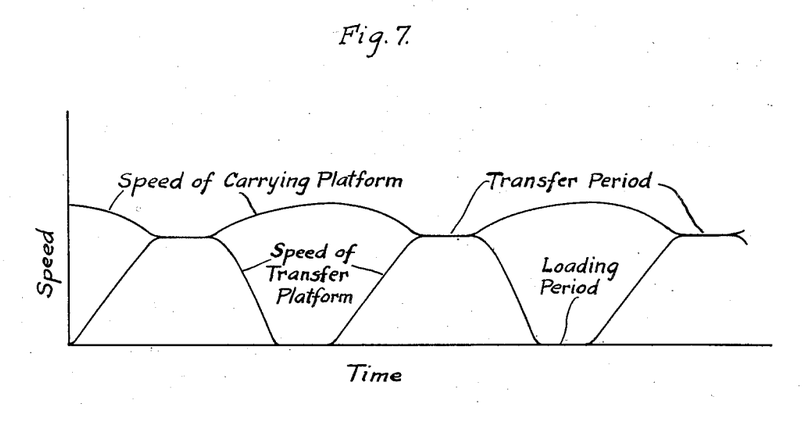
Fig. 7 is a view of "speed-time" curves for the two trains, illustrating the sequence of operation and the corresponding speeds of the two trains at any time during the cycle of operation.

As shown by the curves in Fig. 7, the field excitation of the motors M1 is varied just enough to control the speed of the carrying platforms over a range of approximately five miles per hour. The fields of the machines MG, which supply the current for the motors M2, are varied from open circuit to maximum field by comparatively small increments in order to effect the desired speed range of the transfer platforms which are driven by the motors M2. The fields of the machines M2 are varied slightly during the cycle. The machines are all compound wound, the motors M1 being heavily compounded and the machines MG and M2 being slightly compounded. The connections are such that the machines are differentially compounded when they are functioning as generators and cumulatively compounded when they are functioning as motors.

In order that the functioning of the specific embodiment of the invention may be more clearly understood, the operation of the system will now be described in detail.

Assuming that the switch 22 is closed to energize the induction motor 21, which drives the exciter 19, and that the drum switch 32 is actuated to the "run" position by closing the switch 35 in the "run" position, the high-speed platform 10 may be started by actuating certain switches in the master control station. A switch 61 may be closed to energize the actuating coil 60 of an electrically-operated switch 62 which connects the conductors P and N to the positive and negative terminals of the exciter 19. The energizing circuit for the actuating coil of the switch 62 may be traced from the positive terminal of the exciter 19 through the coil of the switch 62, conductor 63, the switch 61 and conductor 64 to the negative terminal of the exciter 19.

The motor generator set 47 may then be started by closing a switch 65 to close an electrically-operated switch 66 which connects the motor 49 to power conductors 67 and 68, which may be supplied with direct-current power from any suitable source. When the switch 65 is closed, the actuating coil of the switch 66 is connected across the conductors P and N which are energized by the exciter 19, as previously stated. The alternating-current generator 48 supplies the power for driving the synchronous motors 24, one of which is located in each driving station.

As previously described, the frequency of the generator 48 may be regulated by controlling the speed of the motor 49, thereby controlling the speed at which the synchronous motors 24 drive the sequence drums which control the cycle of operation of the platforms or trains.

The starting sequence drum 29 may then be set in operation by closing a push-button switch 69 which establishes the energizing circuit for the actuating coil of an electrically-operated switch 71 which, in turn, establishes an energizing circuit for the electrically-operated clutch 31 which connects the shaft of the sequence drum 29 to the shaft of the synchronous motor 24.

The energizing circuit for the coil of the switch 71 may be traced from the conductor P through the push-button switch 69, conductor 72, the coil of the switch 71, a contact segment 73 on the sequence drum 29, conductor 74, a contact segment 75 on the sequence drum 23 and conductor 76 to the conductor N. It will be noted that it is necessary for both the starting sequence drum 29 and the cycle sequence drum 23 to be in the "off" position before the switch 71 can be closed, thereby ensuring that both sequence drums are in the correct positions to permit the proper control of the trains when they are started.

When the switch 71 is closed an energizing circuit for the electrically-operated clutch 31 is established which extends from the conductor P through the slip rings 77 on the shaft of the motor 24, conductor 78, the contacts of switch 71 and conductor 79 to the conductor N.

When the drum 29 starts rotating, a holding circuit is established for the electrically-operated clutch 31 which extends from the conductor 78 through conductor 89, and a contact segment 81 on the sequence drum 29 to the conductor N. The push-button switch 69 may, therefore, be released after the sequence drum 29 starts rotating. The drum 29 will make one complete revolution and then be stopped in its "off" position, since the holding circuit through the segment 81 is interrupted at the end of the revolution.

The high-speed platform 10 is started by the motors MG and M1 which are connected in series-circuit relation and are connected to the power conductors 17 and 18 through the resistor 37. The motors MG and M1 are connected to the power source through switches 82, 83 and 84 which are closed by the sequence drum 29.

A contact segment 85 on the sequence drum 29 is energized through a conductor E+ which is connected to the conductor P through a contact segment 86 on the drum 32 when it is in the "run" position. Accordingly, the actuating coil of the switch 82 is energized through a circuit which extends from a contact finger 87, energized by the contact segment 85, through conductor 88, an interlock 89 on a switch 91, conductor 92, the actuating coil of the switch 82 and conductor 93 to the conductor N.

The circuit for the actuating coil of the switch 83 may be traced from a contact finger 94 on the sequence drum 29 through conductor 95, the coil of the switch 83, conductors 96 and 97 and an interlock 98 on a switch 99 and conductor 101 to the conductor N.

The circuit for the actuating coil of the switch 84 extends from a contact finger 102 on the sequence drum 29 through conductor 103, the actuating coil of the switch 84, and conductor 104 to the conductor N. A holding circuit is established for the coil of the switch 84, when the switch is closed, through a circuit which extends from the conductor E+ through an interlock 105, the coil 84 and the conductor 104 to the conductor N.

When the switches 82, 83 and 84 are closed, the main motor circuits extend from the power conductor 17 through conductor 106, the contact members of the switch 83, resistor 37, conductor 107, the motors MG, conductors 108 and 109, the contact members of switch 82, conductor 111, the motors M1, conductor 112 and the contact members of switch 84 to the power conductor 18.

The shunt field windings of the motors MG are energized at this time, as a circuit is established for the actuating coil of a switch 113 which connects the shunt field windings for the motors MG to the conductors P and N, which are energized by the exciter 19. However, the shunt field windings of the motors M1 are open at this time and the motors M1 operate as series motors. The circuit for the actuating coil of the switch 113 may be traced from a contact finger 114 on the sequence drum 29 which engages an energized contact segment 115, through conductors 116 and 117, a contact segment 118 on the drum 32, conductor 119, the coil of the switch 113 and conductors 121 and 122 to the conductor N.

Full field is applied to the motors MG at this time since a switch 123 which shunts the entire resistor 26 was previously closed when the drum 29 started rotating. The circuit through the shunt field windings of the motors MG may be traced from the conductor P, through conductor 124, the contacts of switch 113, conductor 125, the separately excited field windings of the motors MG, conductor 126, the contact members of switch 123 and conductor 127 to the conductor N.

The circuit for the actuating coil of the switch 123 may be traced from a contact finger 128, of the sequence drum 29 which engages a contact segment 129 energized by the conductor P, through conductors 131 and 132, a contact segment 133 on the drum 32, conductor 134, the coil of the switch 123 and conductor 127 to the conductor N.

The motors M1 and MG are accelerated by shunting the resistor 37 in successive steps by the closing of the switches 41 and 42. In order to simplify the drawings, only two accelerating switches have been shown, however, it will be understood that as many switches as necessary to provide for the proper acceleration of the motors may be provided.

The circuit for the actuating coil of the accelerating switch 41 may be traced from the contact finger 135 energized by a contact segment 136 on the drum 29, conductor 137, a contact segment 138 on the drum 32, conductor 139, the coil of the switch 41 and conductor 141 to the conductor N. When the drum 29 has moved to the next position, the actuating coil of the switch 42 is energized through a circuit which extends from a contact finger 142 energized by a contact segment 136 on the drum 29, through conductor 143, a contact segment 144 on the drum 32, conductor 145, the coil of the switch 42 and conductors 121 and 122 to the conductor N.

The motors M1 are next temporarily shunted by the closing of the switch 146 and the opening of the switch 82, and the motors MG are connected across the power source in series with the resistor 31. The energizing circuit for the actuating coil of the switch 146 may be traced from a contact finger 147, which engages a contact segment 148 on the drum 29, through conductor 149, the coil of the switch 146, conductor 97, an interlock 98 on the switch 99 and conductor 101 to the conductor N.

The switches 41 and 42 are again closed to shunt the resistor 37 from the motor circuit, after which the circuit of the separately excited field of M1 and the switch 91 are closed to connect the motors M1 to the power source in parallel with the motors MG. The energizing circuit for the coil of the switch 91 may be traced from a contact finger 151 on the sequence drum 29, which engages the contact segment 148, through conductor 152, the coil of the switch 91 and conductor 153 to the conductor N. A holding circuit is established for the coil of the switch 91 through a circuit extending from the conductor E+, through an interlock 154, the coil 91 and conductor 153 to the conductor N.

The separately-excited field windings on the motors M1 have been previously energized by the closing of a switch 155 which connects the field windings to the conductors P and N. Full field excitation is applied to the motors M1, inasmuch as a switch 156 which shunts the resistor 25 is also closed at this time. The circuit through the shunt field windings of the motors M1 extends from the conductor P through conductor 157, the shunt field windings of the motors M1, conductor 158, contact members of the switch 155, conductor 159, contact members of the switch 156 and conductor 161 to the conductor N.

The circuit for the actuating coil of the switch 155 may be traced from a contact finger 162 on the sequence drum 29, which engages the contact segment 115, through conductor 163, the coil of the switch 155 and conductor 164 to the conductor N. A holding circuit is established for the coil of the switch 155 through a circuit which extends from the conductor E+, through conductor 165, an interlock 166, the coil of the switch 155 and conductor 164 to the conductor N.

The energizing circuit for the actuating coil of the switch 156 may be traced from a contact finger 167 on the sequence drum 29, which engages the contact segment 129, through conductors 168 and 169, the coil of the switch 156 and conductor 161 to the conductor N.

In order to still further increase the speed of the motors, thereby accelerating the train, the resistors 25 and 26 are inserted step-by-step into the circuits of the shunt field windings of the motors M1 and MG, respectively. It will be noted that switches 172, 174, 176 and 178, which shunt the resistor 26, were closed simultaneously with the switch 123, also the switches 181 to 184, inclusive, which shunt the resistor 25, were closed simultaneously with the switch 156. These switches are opened in successive relation as the sequence drum 29 advances, thereby inserting the resistors 25 and 26 in the shunt field circuits of the motors M1 and MG, respectively, to increase the speed of the motors.

When the high speed platform 10 is accelerated to substantially full speed, the switches 83 and 146 are opened, thereby disconnecting the motors MG from the power conductors 17 and 18. As the starting drum 29 nears the completion of its revolution, a contact finger 185 thereon engages a contact segment 186 thereby closing the switch 99 to connect the motors M2 in parallel with the machines MG. The energizing circuit for the actuating coil of the switch 99 may be traced from the contact finger 185 through conductor 187, the coil of the switch 99 and conductor 188 to the conductor N. A holding circuit is established for the coil of the switch 99 which extends from the conductor E+, through an interlock 189, the coil of the switch 99 and conductor 188 to the conductor N.

It will be seen that the motors M1 are now connected to the power source, the circuit extending from the power conductor 17, through contact members of switch 91, conductors 191 and 111, the motors M1, the conductor 112 and the contact members of switch 84 to the power conductor 18. The motors M2 are connected across the machines MG through a circuit which extends from one terminal of the machines MG, through the conductor 107, conductor 192, the contact member 193 on the switch 99, conductors 194 and 195, the motors M2, conductor 196, the contact member 197 on the switch 99 and conductor 198 to another terminal of the motors MG.

The shunt field windings of the motors M2 are connected across the conductors P and N through a circuit which extends from the conductor P, through conductor 201, the shunt field windings of the motors M2, conductors 202, the resistor 27 and conductor 203 to the conductor N.

The motor connections are now established for normal operation of both the platforms 10 and 11 and the cycle drum 23, which controls the trains during normal operation, may be started by closing a switch 204 which closes a contactor 205, thereby energizing the electrically-operated clutch 28 which connects the shaft of the drum 23 to the synchronous motor 24. The circuit for the actuating coil of the switch 205 may be traced from the conductor P through the switch 204, conductor 206, the coil of the switch 205, conductor 74, contact segment 75 on the drum 23 and conductor 76 to conductor N.

When the switch 205 is closed, the clutch 28 is energized through a circuit extending from the conductor P through the slip rings 207, conductor 208, the contact members of switch 205 and conductor 209 to the conductor N. A holding circuit for the clutch 28 is established which extends from the conductor 208, through conductor 211 and a contact segment 212 on the drum 23 to the conductor N.

As described hereinbefore, the starting drum 29 is automatically stopped when it has made one complete revolution. However, the cycle drum 23 is operated continuously as long as the switch 204 is closed. Therefore, the speed of the trains 10 and 11 is controlled by the cycle drum, which operates continuously during normal operation of the trains.

As previously explained, the speed of the motors is entirely controlled throughout the cycle of operation by varying the field strength of the motors. This is accomplished by means of the cycle drum 23 which controls the operation of the switches which shunt the resistors in the field circuits.

At the beginning of the cycle, the resistors 25 and 26 are connected in the field circuits of the motors M1 and MG, respectively, but the resistor 27 is shunted out of the circuit of the field winding of the motors M2 since the switches 213 and 214 are both closed. The circuit for the actuating coil of the switch 213 may be traced from a contact finger 215, which engages an energized segment 216 on the drum 23, through conductor 217, the coil of the switch 213 to the conductor N. The energizing circuit for the coil of the switch 214 may be traced from a contact finger 218 on the drum 23, through conductor 219, a contact segment 221 on the drum 32, conductor 222 and the coil of the switch 214 to the conductor N.

A contact finger 223 on the drum 23 which is connected to the conductor 116 is energized by the contact segment 216, thereby energizing the actuating coil of the switch 113 through a circuit previously traced. The switch 113 connects the shunt field windings of the motors MG to the conductors P and N through a circuit previously traced, and it will be remembered that a holding circuit was established for the switch 155 which connects the shunt field windings of the motors M1 to the conductors P and N. The switch 155, therefore, remains in the closed position.

As the cycle drum 23 advances, the resistors 25 and 26 are shunted, step-by-step, thereby decreasing the speed of the motors M1 and increasing the voltage of the machines MG, which are functioning as generators supplying the current for operating the motors M2. Accordingly, the carrying platform 10 is decelerated and the transfer platform 11 is accelerated, as shown in the curves in Fig. 7.

The resistor 25 is shunted by the switches 184, 183, 182, 181 and 156 as the contact fingers 224 to 228, inclusive on the drum 23, are energized by the contact segment 216 as the cycle drum advances. Simultaneously, the resistor 26 is shunted by the switches 178, 177, 176, 175, 174, 173, 172, 171 and 123 when the contact fingers 231 to 239, inclusive, are energized by a contact segment 241 on the drum 23.

As the two platforms approach the same speed the gong 56 is sounded to notify the passengers to transfer from the one platform to the other. The energizing circuit for the gong 56 extends from a contact finger 242 on the drum 23 which is energized by the contact segment 241 through conductor 243 and a conductor 244 which extends along the track, and the gong 56 to a negative conductor which also extends along the track. The gong is again sounded before the doors start to close in order to warn the passengers that the doors are going to close.

When the drum 23 has rotated through a certain angle the speeds of the two platforms will be approximately the same and the doors 52 on the cars are automatically opened by the motors 51, as previously explained. The motors are energized by the closing of an electrically-operated switch 245. The energizing circuit for the actuating coil of the switch 245 may be traced from a contact finger 246 on the drum 23, which is energized by the segment 241, through conductor 247 and the coil of switch 245 to the conductor N.

As described hereinbefore, the two trains run at the same speed for a definite period of time to permit the transfer of passengers, after which the transfer platform 11 is decelerated, while the carrying platform 10 is accelerated. It will be seen that, as the cycle drum 23 advances, the resistors 25 and 26 are inserted in the field circuits step by step thereby gradually effecting a change in the speed of the trains.

As previously explained, the machines M2 act as generators when the platform 11 is being decelerated, thereby utilizing the stored energy of this platform to generate electric current which is supplied to the machines MG, which act as motors to help accelerate the high-speed platform 11. As the drum 23 approaches the end of the cycle, the slow-speed platform 11 is brought to a standstill by the closing of the switches 44 and 248 which short circuit the motors M2, thereby stopping the slow-speed platform. The circuit for the actuating coil of the switch 44 may be traced from a contact finger 249 on the drum 23, which is energized by the contact segment 216, through conductor 251, a contact segment 252 on the drum 32, conductor 253, the coil of the switch 44 and conductor 254 to the conductor N.

The circuit for the actuating coil of the switch 248 extends from a contact finger 255 on the drum 23, through conductor 256, a contact segment 257 on the drum 32, conductor 258, the coil of the switch 248 and conductor 254 to the conductor N. As previously stated, the slow speed platform 11 remains at a standstill or moves at an extremely slow speed for a definite period to permit the loading and unloading of passengers, after which it is started and gradually accelerated and the cycle of operation is again repeated.

As previously explained, both platforms may be quickly stopped in the case of an emergency by throwing the switch 35 to the "stop" position thereby deenergizing the solenoid 33 and energizing the solenoid 34 which actuates the drum 32 to its "stop" position. When this is done, the conductor E+ is deenergized, thereby deenergizing the contact segments on the sequence drums which causes the switches 84, 91 and 99 to be opened, thereby disconnecting the motors M1 from the power source and interrupting the connections between the motor M1 and M2.

When the drum 32 is actuated to its "stop" position, a switch 261 is closed to establish a dynamic braking circuit for the motors MG, and also the switch 248 is closed to establish a dynamic braking circuit for the motors M2. Full field strength is applied to the machines MG and M2 at this time. The circuit for the actuating coil of the switch 261 may be traced from a contact finger 262 on the switch 32, which engages a contact segment 263 energized by the conductor P, through conductor 264 and the coil of the switch 261 to the conductor N. The circuit for the coil of the switch 248 extends through a circuit previously traced when the conductor 258 is energized by the contact segment 263.

The resistors 37 and 38 are connected in the circuits of the motors MG and M2, respectively, in order to reduce the current flowing through the motors at the beginning of the dynamic braking action. These resistors are shunted step by step by the switches 41 and 42, and, 43 and 44, which are controlled by the current limit relays 45 and 46, respectively. The energizing circuit for the actuating coil of the switch 41 may be traced from a contact finger 265, which is energized by the contact segment 263 on the drum switch 32, through conductor 266, the contact members of the limit relay 45, conductor 267, an interlock 268 on the switch 41, the actuating coil of the switch 41 and conductor 141 to the conductor N.

When the switch 41 closes, thereby shunting a portion of the resistor 37, the current limit relay 45 is actuated to its uppermost position. As the speed of the train decreases, the current in the motor circuits will decrease to a value which will permit the limit relay 41 to drop to its lowermost position thereby establishing a circuit for the actuating coil of the switch 42, in a manner well known in the art.

In a similar manner, the actuating coil of the switch 43 is energized through a circuit which extends from a contact finger 269 on the drum switch 32, through conductor 271, the contact members of the limit relay 46, conductor 272, an interlock 274, the actuating coil of the switch 43 and conductor 275 to the conductor N. The switch 44 is closed in a manner similar to the switch 42 when the motor current is reduced to a predetermined value.

When the drum switch 32 is actuated to the "stop" position, full field strength is applied to the machines MG and M2 by closing the switches 113, 123 and 214 thereby ensuring that the machines will function as generators and quickly bring the trains to a stop by dynamic braking action, the stored energy of the trains being dissipated in the resistors 37 and 38.

Although I have illustrated and described a control system for controlling the operation of a transportation system comprising two continuous trains of cars or platforms, it will be apparent that the control system herein disclosed may be readily adapted to the controlling of a transportation system utilizing more than two trains of cars, as for instance, a system having three trains which operate at different rates of speed. Therefore, my control system is not limited to the control of continuous transportation systems having only two trains of cars.

It will be evident from the foregoing description that I have provided a means of controlling the operation of the trains of a high-speed transportation system suitable for transporting a large number of people in a short time, which is highly efficient in operation, as all losses of energy, such as ordinarily result from stopping the trains by mechanical brakes, are eliminated, since the stored energy of one train is utilized to help accelerate another train. Also, by properly proportioning the relative speeds of the two trains a high load factor is secured and, since the only energy used is that required to overcome train resistance and to supply losses in the machines utilized to drive the trains, the total amount of power required to operate the system is comparatively small.

Since numerous changes may be made in the above-described construction and different embodiments of the invention may be made without departing from the spirit and scope thereof, it is intended that all matter contained in the above description, or shown in the accompanying drawings shall be interpreted as illustrative and not in a limiting sense.

I claim as my invention:

1. In a transportation system, in combination, a plurality of vehicles, means for propelling the vehicles at variable rates of speed in continuous regular cycles, one vehicle being accelerated while another is being decelerated, and electrical means for effecting a transfer of energy from one vehicle to another when one vehicle is being accelerated and the other is being decelerated.

2. In a transportation system, in combination, a plurality of vehicles, means for propelling the vehicles at variable rates of speed in continuous regular cycles, one vehicle being accelerated while another is being decelerated, and electrical means disposed to be driven by one vehicle when it is decelerating to generate and supply electrical energy for driving and accelerating another vehicle.

3. In a transportation system, in combination, a plurality of continuously-moving vehicles disposed on substantially parallel lines, means for accelerating and decelerating the vehicles in a predetermined cycle of operation, the maximum speed of one vehicle being substantially equal to the minimum speed of another vehicle, and means for utilizing the energy given up by one vehicle when decelerating to accelerate another vehicle.

4. In a transportation system, in combination, a plurality of vehicles disposed on substantially parallel lines, means for propelling the vehicles continuously in the same direction, means for accelerating and decelerating the vehicles in a predetermined cycle of operation, the maximum speed of one vehicle being substantially equal to the minimum speed of another vehicle, and means for utilizing the energy given up by one vehicle when decelerating to accelerate another vehicle.

5. In a transportation system, in combination, a plurality of continuous trains of vehicles disposed on substantially parallel lines, means for propelling the vehicles continuously in the same direction at variable rates of speed, the maximum speed of one vehicle being substantially the same as the minimum speed of another vehicle to permit an exchange of passengers between the vehicles, and means for effecting a transfer of energy from one train of vehicles to another when one train is being accelerated and the other is being decelerated.

6. In a transportation system, in combination, a plurality of vehicles disposed on substantially parallel lines, means for propelling the vehicles in the same direction at variable rates of speed, means for controlling the acceleration and deceleration of the vehicles in a predetermined cycle of operation one vehicle being accelerated while another is being decelerated, and electrical means for utilizing the energy given up by one vehicle when decelerating to accelerate another vehicle.

7. In a transportation system, in combination, a plurality of continuous trains of vehicles disposed on adjacent lines, means for propelling the vehicles in the same direction at variable rates of speed, the maximum speed of one train being substantially equal to the minimum speed of another train, electrical means for controlling the acceleration and deceleration of the vehicles, and electrical means for effecting a transfer of energy at a variable voltage from one train of vehicles to another when one train is being accelerated and the other is being decelerated.

8. In a transportation system, in combination, a plurality of vehicles disposed on adjacent lines, means for propelling the vehicles in the same direction at variable rates of speed, the maximum speed of one vehicle being substantially the same as the minimum speed of another vehicle to permit an exchange of passengers between the vehicles, electrical means for controlling the acceleration and deceleration of the vehicles, and electrical means for effecting a transfer of energy from one vehicle to another when one vehicle is being accelerated and the other is being decelerated.

9. In a transportation system, in combination, a plurality of vehicles disposed on adjacent lines, means for propelling the vehicles in the same direction at variable rates of speed, the maximum speed of one vehicle being substantially the same as the minimum speed of another vehicle to permit a transfer of passengers, means for accelerating one vehicle while another vehicle is being decelerated, and electrical means for effecting a transfer of energy from one vehicle to another when one vehicle is being accelerated and the other is being decelerated.

10. In a transportation system, in combination, two continuous trains of vehicles disposed on adjacent lines, means for propelling the trains in the same direction at variable rates of speed, the maximum speed of one train being substantially the same as the minimum speed of the other train to permit a transfer of passengers, means for so controlling the acceleration and deceleration of the trains that the speed of one train is a maximum when the speed of the other is a minimum, and electrical means for effecting a transfer of energy from one train to the other during the acceleration and deceleration of the respective trains.

11. In a transportation system, in combination, a plurality of vehicles disposed on adjacent lines, a plurality of motors for propelling the vehicles in the same direction at variable rates of speed, means for connecting the motors to a source of power, and means for controlling the operation of the motors to cause the vehicles to be accelerated and decelerated in continuous cycles, the speed of one vehicle being a maximum when the speed of another is a minimum and the maximum speed of the one vehicle being substantially the same as the minimum speed of the other vehicle.

12. In a transportation system, in combination, a plurality of vehicles disposed on adjacent lines, a plurality of stationary motors for propelling the vehicles in the same direction at variable rates of speed, means for connecting certain of the motors to a source of power, means for varying the field strength of the motors to cause the vehicles to be accelerated and decelerated in continuous cycles, the maximum speed of one vehicle being substantially the same as the minimum speed of another vehicle to permit a transfer of passengers, and means for controlling the motors to cause one vehicle to be accelerated while another is decelerated, thereby maintaining a substantially constant load on the power source.

13. In a transportation system, in combination, a plurality of vehicles disposed on adjacent lines, a plurality of stationary motors for propelling the vehicles at variable rates of speed, said motors being disposed in a plurality of stations along the system, switching means for connecting certain of the motors to a power source, switching means for connecting the other motors to machines driven by the motors connected to the power source, and control means for controlling the speed of the motors to accelerate and decelerate the vehicles in a predetermined cycle, the maximum speed of one vehicle being substantially the same as the minimum speed of another vehicle.

14. In a transportation system, in combination, a plurality of vehicles disposed on adjacent lines, a plurality of stationary motors for propelling the vehicles at variable rates of speed, said motors being disposed in a plurality of stations along the system, control means located in each station for controlling the speed of the motors to accelerate and decelerate the vehicles in a predetermined cycle, one line of vehicles being accelerated while another is being decelerated, and means for operating the control means in all stations in synchronism, thereby providing uniform control of all motors in the system.

15. In a transportation system, in combination, a plurality of vehicles disposed on adjacent lines, a plurality of stationary motors for propelling the vehicles at variable rates of speed, said motors being disposed in a plurality of stations along the system, a sequence drum for controlling the speed of the motors to vary the speed of the vehicles in predetermined cycles, one line of vehicles being accelerated while another is being decelerated, means for operating said sequence drum, and remote control means for controlling the operation of said drum.

16. In a transportation system, in combination, a plurality of vehicles disposed on adjacent lines, a plurality of stationary motors for propelling the vehicles at variable rates of speed, said motors being disposed in a plurality of stations along the system, a sequence drum for controlling the starting of said motors, a second sequence drum for controlling the speed of the motors to vary the speed of the vehicles in a predetermined cycle, one line of vehicles being accelerated while another is being decelerated, means for operating said drums at a predetermined speed, interlocking means for preventing the drums from being started unless they are in the off position, and means for causing the drums to be rotated to the off position before they are stopped.

17. In a transportation system, in combination, a plurality of vehicles disposed on adjacent lines, a plurality of stationary motors for propelling the vehicles at variable rates of speed, said motors being disposed in a plurality of stations along the system, a plurality of sequence drums for controlling the speed of the motors to vary the speed of the vehicles in a predetermined cycle, one line of vehicles being accelerated while another is being decelerated, means for operating all of said drums in synchronism, and means for varying the speed of rotation of said drums to vary the time of the cycle of operation.

18. In a transportation system, in combination, a plurality of vehicles disposed on adjacent lines, means for propelling the vehicles in the same direction at variable rates of speed, the maximum speed of one vehicle being equal to the minimum speed of another vehicle, doors on the vehicles for permitting the transfer of passengers from one vehicle to the other, means for operating said doors, and means for controlling the operation of the doors to cause them to be opened during the time that the vehicles are traveling at substantially the same speeds and closed when they are traveling at different speeds.

19. In a transportation system, in combination, two continuous trains of vehicles disposed on adjacent lines, means for propelling the vehicles in the same direction at variable rates of speed, the maximum speed of one train being equal to the minimum speed of the other train, doors on the vehicles for permitting the transfer of passengers from one train to the other, means for operating said doors, means for controlling the operation of the doors to cause them to be opened during the time that the trains are traveling at substantially the same speed and closed when they are traveling at different speeds, and means for giving a signal to the passengers before the doors are opened and before the doors start to close.

20. In a transportation system, in combination, a plurality of vehicles disposed on adjacent lines, a plurality of stationary motors for propelling the vehicles in the same direction at variable rates of speed in continuous cycles, switching means for connecting the motors to a power source, control means for controlling the speed of the motors to accelerate one line of vehicles and decelerate another line of vehicles simultaneously, and means for deenergizing said control means and establishing dynamic braking connections for the motors to stop said vehicles.

21. In a transportation system, in combination, a plurality of vehicles disposed on adjacent lines, a plurality of stationary motors for propelling the vehicles in the same direction at variable rates of speed in continuous cycles, switching means for connecting certain of the motors to a power source, control means for controlling the speed of the motors to accelerate one line of vehicles and decelerate another line of vehicles simultaneously, emergency means for deenergizing said control means and disconnecting the motors from the power source, means for establishing dynamic braking connections for the motors to stop the vehicles, and means for controlling the current in the motor circuits during the dynamic braking action.

22. In a transportation system, in combination, a plurality of vehicles disposed on adjacent lines, a plurality of stationary motors for propelling the vehicles in the same direction at variable rates of speed in continuous cycles, switching means for connecting certain of the motors to a power source, control means for controlling the speed of the motors to accelerate one line of vehicles and decelerate another line of vehicles, simultaneously, emergency means for deenergizing said control means and disconnecting the motors from the power source, means for establishing dynamic braking connections for the motors to stop the vehicles, resistors for controlling the current in the motor circuits, and relay means for causing the resistors to be shunted step-by-step to control the dynamic braking action of the motors.

23. In a transportation system, in combination, a plurality of vehicles disposed on adjacent lines, a plurality of motors for propelling the vehicles at variable rates of speed in continuous cycles, said motors being disposed in stations throughout the system, control means in each station for controlling the speed of the motors to accelerate the vehicles on one line while the vehicles on another line are being decelerated, and means for controlling the operation of said control means to maintain uniform control of all the motors in the system.

24. In a transportation system, in combination, a plurality of vehicles disposed on adjacent lines, a plurality of motors for propelling the vehicles at variable rates of speed, said motors being disposed in a plurality of stations throughout the system, control means located in each station for controlling the operation of the motors to accelerate and decelerate the vehicles in a predetermined cycle, the vehicles on one line being accelerated while those on another line are being decelerated, means for operating the control means in all stations in synchronism, and means for uniformly varying the operation of the control means in all stations to vary the cycle of operation.

25. In a transportation system, in combination, a plurality of vehicles disposed on adjacent lines, a plurality of motors for propelling the vehicles at variable rates of speed, said motors being disposed in stations throughout the system, a controller located in each station for controlling the speed of the motors to accelerate and decelerate the vehicles in a predetermined cycle, the vehicles on one line being accelerated while those on another line are being decelerated, means for operating the controllers in all stations at a uniform speed, and means for uniformly varying the speed of the controllers in all stations to vary the cycle of operation.

26. In a transportation system, in combination, a plurality of vehicles disposed on adjacent lines, a plurality of motors for propelling the vehicles at variable rates of speed, said motors being disposed in a plurality of stations along the system, a sequence controller in each station for controlling the speed of the motors to vary the speed of the vehicles in a predetermined cycle, the vehicles on one line being accelerated while those on another line are being decelerated, means for operating the sequence controllers, and remote control means for controlling the operation of said controllers.

27. In a transportation system, in combination, a plurality of continuous trains of vehicles disposed on adjacent lines, a plurality of stationary motors for propelling the vehicles at variable rates of speed, said motors being disposed in a plurality of stations along the system, a plurality of sequence controllers for controlling the speed of the motors to vary the speed of the vehicles in a predetermined cycle, the vehicles on one line being accelerated while those on another line are being decelerated, means for operating all of said sequence controllers at a uniform speed and means for uniformly varying the speed of the controllers in all stations to vary the time of the cycle of operation.

28. In a transportation system, in combination, two continuous trains of cars disposed on adjacent lines, means for propelling the trains of cars in the same direction at variable rates of speed, the maximum speed of one train being equal to the minimum speed of the other train, the cars of one train being of an enclosed type and those of the other train being of an open type, doors on the enclosed cars for permitting the transfer of passengers from one train to the other, means for operating said doors, and means for controlling the operation of the doors to cause them to be opened during the time that the vehicles are traveling at substantially the same speeds and closed when they are travelling at different speeds.

29. In a transportation system, in combination, a plurality of vehicles, means for accelerating and decelerating the vehicles in predetermined continuous cycles of operation, the deceleration of one vehicle being controlled by the acceleration of another, means for governing the relative speeds of the vehicles, and means for effecting a transfer of energy from one vehicle to another.

30. In a transportation system, in combination, two continuous trains of vehicles disposed on adjacent lines, means for accelerating and decelerating the trains in a predetermined cycle of operation, the deceleration of the one train being controlled by the acceleration of the other, and control means for varying the cycle of operation of the trains.

31. In a transportation system, in combination, two continuous trains of vehicles disposed on adjacent lines, a plurality of dynamo-electric machines for propelling the trains at variable rates of speed, said machines being disposed in a plurality of stations along the system, switching means for connecting certain of the machines to a power source, and means for interconnecting the remainder of the machines in a manner to effect a transfer of energy from one train to the other when the trains are decelerated and accelerated.

32. In a transportation system, in combination, two continuous trains of vehicles disposed on adjacent lines, a plurality of dynamo-electric machines for accelerating and decelerating the trains in a predetermined cycle of operation, said machines being disposed in a plurality of stations along the system, switching means for connecting certain of the machines to a power source, and means for interconnecting the remainder of the machines in a manner to effect a transfer of energy from one train to the other when the trains are decelerated and accelerated, and means for controlling the speed of the machines to accelerate and decelerate the trains in the predetermined cycle.

33. In a transportation system, in combination, two continuous trains of vehicles disposed on adjacent lines, a plurality of dynamo-electric machines for accelerating and decelerating the trains in a predetermined cycle of operation, said machines being disposed in a plurality of stations along the system, switching means for connecting certain of the machines to a power source, means for driving others of the machines by the machines connected to the power source, means for interconnecting part of the machines in a manner to effect a transfer of energy from one train to the other when the trains are decelerated and accelerated, and control means for varying the field strength of the machines to cause the interconnected machines to act alternately as motors and generators to accelerate and decelerate the trains.

34. In a transportation system, in combination, two continuous trains of vehicles disposed on adjacent lines, a plurality of dynamo-electric machines for propelling the trains at variable rates of speed, said machines being disposed in a plurality of stations along the system, the machines in each station comprising a motor and a dynamo disposed to propel one of said trains and a dynamo disposed to propel the other train, means for connecting the motor to a power source, means for interconnecting the said dynamos in a manner to effect a transfer of energy from one train to the other when the trains are decelerated and accelerated, and control means for varying the excitation of the machines to cause the interconnected machines to act alternately as motors and generators to accelerate and decelerate the trains.

35. In a transportation system, in combination, two continuous trains of vehicles disposed on adjacent lines, a plurality of dynamo-electric machines for propelling the trains at variable rates of speed, said machines being disposed in a plurality of stations along the system, the machines in each station comprising a pair of motors and a pair of dynamos disposed to propel one of said trains and a pair of dynamos disposed to propel the other train, means for electrically connecting the motors to a power source, means for mechanically connecting one pair of dynamos to the motors, means for interconnecting the dynamos in a manner to effect a transfer of energy from one train to the other when the trains are decelerated and accelerated and control means for varying the excitation of the machines to cause the interconnected machines to act alternately as motors and generators to accelerate and decelerate the trains.

36. In a transportation system, in combination, two continuous trains of vehicles disposed on adjacent lines, means for propelling one of the trains continuously at a relatively high average speed, means for propelling the other train at speeds varying between a relatively low speed and a maximum speed substantially equal to the minimum speed of the high speed train to permit a transfer of passengers, and means for controlling the acceleration and deceleration of the trains.

37. In a transportation system, in combination, two continuous trains of vehicles disposed on adjacent lines, means for propelling one of the trains continuously at a relatively high average speed, means for propelling the other train at speeds varying between a standstill and a maximum speed substantially equal to the minimum speed of the high speed train to permit a transfer of passengers, means for controlling the acceleration and deceleration of the trains, and means for effecting a transfer of energy from one train to the other when one train is being decelerated and the other is being accelerated.

38. In a transportation system, in combination, two continuous trains of vehicles disposed on adjacent lines, means for propelling one of the trains continuously at a relatively high average speed, means for propelling the other train at speeds varying between a standstill and a maximum speed substantially equal to the minimum speed of the high speed train, means for controlling the acceleration and deceleration of the trains to cause the high speed train to be at its maximum speed when the other train is at its minimum speed to permit an exchange of passengers between the trains, and electrical means for effecting a transfer of energy from one train to the other when one train is being decelerated and the other is being accelerated.

39. In a transportation system, in combination, a stationary platform, a train of vehicles disposed adjacent the stationary platform, a second train of vehicles disposed adjacent the first train, means for propelling the second train at a relatively high average speed, means for propelling the first train at speeds varying between a relatively low speed and a maximum speed substantially equal to the minimum speed of the second train to permit an exchange of passengers between the trains and the stationary platform, and automatic means for causing the trains to accelerate and decelerate in predetermined continuous opposing cycles.

40. In a transportation system, in combination, a stationary platform, a continuous train of vehicles disposed adjacent the stationary platform, a second continuous train of vehicles disposed adjacent the first train, means for propelling the second train continuously at a relatively high average speed, means for propelling the first train at speeds varying between a relatively low speed or standstill and a maximum speed substantially equal to the minimum speed of the second train to permit an exchange of passengers between the trains and the stationary platform, means for causing the trains to accelerate and decelerate in predetermined continuous opposing cycles, and means for effecting a transfer of energy from one train to the other when one train is being decelerated and the other is being accelerated.

NORMAN W. STORER.